March 2, 1926.   A. I. ALBRIGHT ET AL   1,575,517
SPRING PERCH REMOVER
Filed August 27, 1924
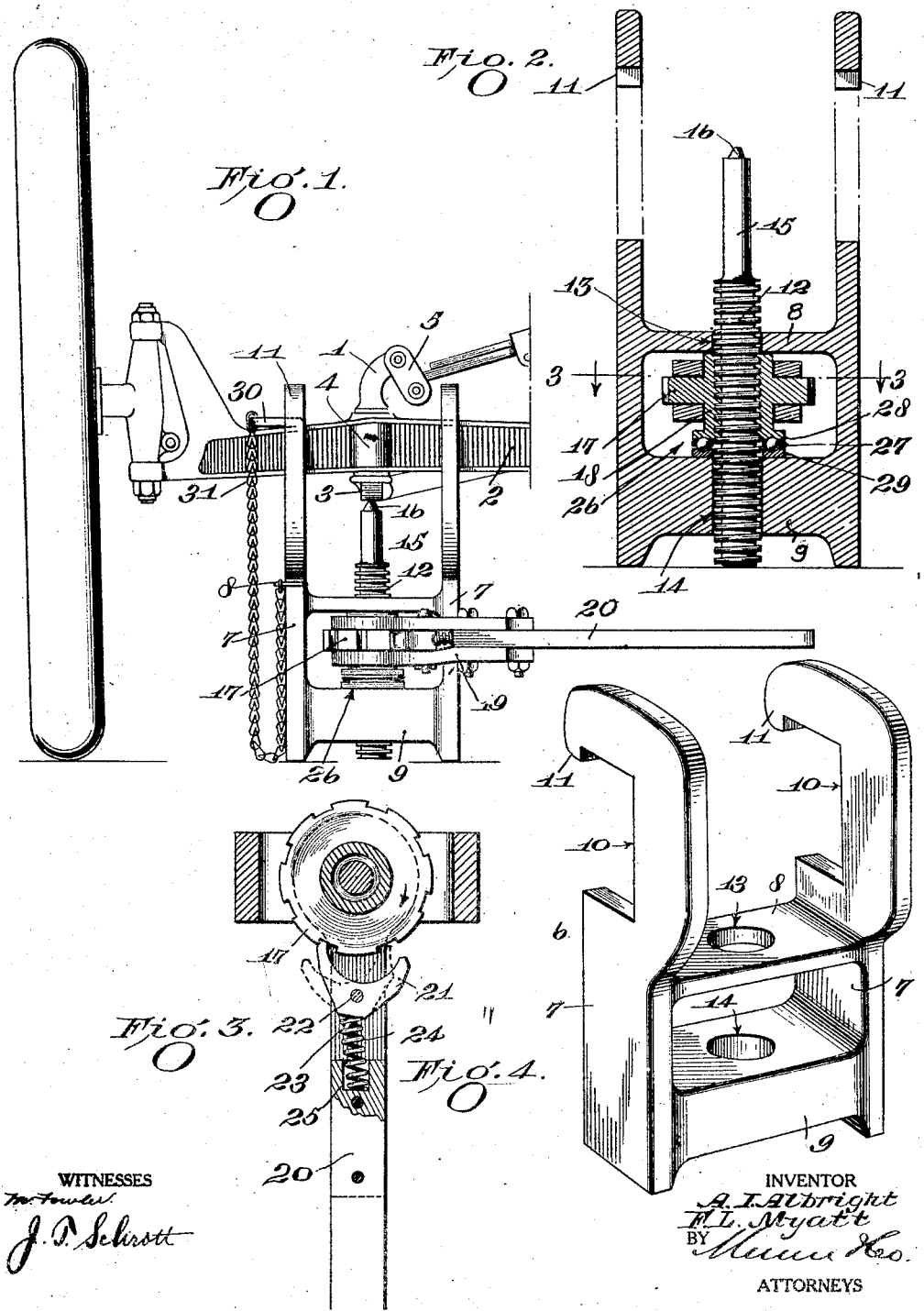
WITNESSES
INVENTOR
A. I. Albright
F. L. Myatt
BY
ATTORNEYS Patented Mar. 2, 1926.

1,575,517

UNITED STATES PATENT OFFICE.

ASA IVY ALBRIGHT AND FRANCIS LAMAR MYATT, OF MONROE, LOUISIANA.

SPRING-PERCH REMOVER.

Application filed August 27, 1924. Serial No. 734,503.

*To all whom it may concern:*

Be it known that we, ASA IVY ALBRIGHT and FRANCIS LAMAR MYATT, citizens of the United States, and residents of Monroe, in the parish of Ouachita and State of Louisiana, have invented certain new and useful Improvements in Spring-Perch Removers, of which the following is a specification.

Our invention relates to improvements in spring perch removers, and it consists of the constructions, combinations and arrangements herein described and claimed.

An object of the invention is to provide a light yet strong press particularly for the purpose of removing spring perches from the front axles of Ford automobiles without the necessity of removing the axle from the automobile in order to permit knocking the perch bolt out.

Other objects and advantages appear in the following specification, reference being had to the accompanying drawing, in which Figure 1 is a front elevation of enough of a front axle of the Ford automobile to illustrate the application of the press.

Figure 2 is a central longitudinal section.

Figure 3 is a detail horizontal section on the line 3—3 of Figure 2.

Figure 4 is a detail perspective view of the frame.

In automobile repair work it frequently becomes necessary to remove the perch 1 from the front axle 2 of the Ford automobile. The press herein disclosed is designed particularly for use in connection with the Ford automobile, although it should be understood that it may be used in connection with automobiles of other makes and also in other fields of use so long as the principles of the press may be employed. The perch 1 has a shank or bolt 3 which passes through an opening in an enlargement 4 on the axle. The purpose of the perch is to support one end of a spring shackle 5, or in the event that the automobile carries shock absorbers, the perch is used to provide a mounting for one of the link connections.

The improved press consists of a frame 6 composed of side members 7 which are connected by a web 8 and a plate 9. The upper ends of the side members are shaped to provide recesses 10 for the occupancy of the front axle 2 when the press is in place as in Figure 1. The upper extremities of the side members terminate in hooks 11 by which the press may be hung upon the axle without danger of inadvertantly slipping off.

A screw shaft 12 occupies aligning bores 13 and 14 in the web 8 and plate 9 respectively. This shaft terminates in a reduced and smooth portion 15 which is herein known as a pilot. The pilot, in turn, is surmounted by a tip 16 for the purpose of engaging the center of the bolt 3.

A ratchet 17 has a threaded hub 18 to receive the threaded shaft 12. The yoke 19 of an actuating lever 20 has bearing upon the hub 18 on each side of the ratchet. The yoke carries a double dog 21 to engage the teeth of the ratchet. The dog is pivoted at 22, and has a lug 23 for the purpose of keeping one end of the spring 24 seated against the dog. The other end of the spring occupies a recess 25 in the adjacent end of the lever.

A bearing 26 receives the thrust of the screw shaft 12. This bearing comprises the bearing ball cage 27 which is located between a flange 28 on the hub 18, and a washer 29 resting upon the frame 6.

The particular disposition of the spring 24 in reference to the double dog 21 keeps one or the other of the dogs in engagement with the ratchet. The operator may readily move the dog into either position (Fig. 3) where it will stay by virtue of the pressure of the spring 24 being in a line outside the pivot 22. This being accomplished the operator moves the actuating lever 20 back and forth in the proper direction, resulting in the movement of the screw shaft 12 toward the bolt 3.

In effect the frame 6 holds down on the axle 2 while the screw shaft 12 pushes up on the bolt 3. The purpose of the smooth pilot 15 is to permit following the bolt 3 through the hole in the enlargement 4 until the spring perch is sufficiently loosened to permit removal by hand. The removal of a spring perch often involves considerable difficulty. The bolt 3 is always tightly fitted in the hole which is provided therefor, and in addition to this not infrequently becomes rusted in place. This adds to the difficulty of removing the bolt.

The customary expedient is to hammer on the end of the bolt until the spring perch comes out, and it is usually necessary to remove the axle from the automobile in order to do this. The perch remover is a decided labor saver in that it effectively operates for the purpose without doing much more than the actual work of supplying the necessary power for the raising of the screw shaft.

The operation is readily understood from the following additional description. The frame 6 is hooked upon the axle 2, making use of the hooks 11 and recesses 10. The hooks insure keeping the frame in position.

It may be found necessary to center the shaft 12 with the bolt 3, that is to say, properly align axes. When this is necessary, use is made of a wedge 30 which is intended to be permanently attached to and carried by the frame 6 through the medium of a chain 31. By inserting the wedge 30 under one or the other of the hooks 11 the frame can be adjusted so that the shaft 12 and bolt 3 come in exact alignment.

The operator will now actuate the lever 23, having first seen to it that the double dog 21 is in such position (Fig. 3) as will produce the desired turning of the ratchet 17. The pilot 15 will follow the bolt 3 through, and having loosened the bolt sufficiently for its removal the operator may simply reverse the dog 21 and the action of the lever 23 until the frame may be removed from the axle.

While the construction and arrangement of the improved perch is that of a generally preferred form, obviously modifications and changes may be made without departing from the spirit of the invention or the scope of the claim.

We claim:—

A spring perch remover comprising a frame consisting of parallel side members terminating in hooked ends which have adjacent recesses for the reception of an axle, a web and a web plate connecting the side members but being in spaced relation to each other, a screw shaft passing through a bore in said web and said plate, said screw shaft terminating in a reduced portion constituting a pilot which is surmounted by a tip, a ratchet situated between the web and web plate having a threaded hub in which the shank is screwed, a lever having a dog by which the ratchet is operated, and bearing means interposed between said ratchet hub and said web plate.

ASA I. ALBRIGHT.
FRANCIS LAMAR MYATT.